United States Patent Office 2,989,402
Patented June 20, 1961

2,989,402
PROCESS FOR REDUCING MOISTURE LOSS FROM MEAT
Thomas Reid Anderson, Walnut Creek, Calif.
(4605 Gould Ave., La Canada, Calif.)
No Drawing. Filed Mar. 2, 1959, Ser. No. 796,246
3 Claims. (Cl. 99—169)

This invention relates to an improved process for reducing moisture loss from meat.

The applicant's copending application Serial No. 754,700, filed August 13, 1958, now Patent No. 2,948,623, which is a continuation-in-part of an earlier filed application reveals that certain film-forming fatty materials such as cetyl alcohol (hexadecanol), arachidic acid, and octadecanol form a thin film, believed to be monomolecular in thickness, on meat which significantly slows the loss of moisture from the treated meat. The film forming material is applied to the meat through an aqueous dispersion.

It has now been found that the fatty film may be formed through the application of a glycerol dispersion of the fatty material to the meat surface. Preferably, the application is achieved with the use of a glycerol-water dispersion (25 to 50% volume glycerol concentration) of the film forming material. The dispersion may be prepared as disclosed in the copending application through the use of an emulsifier or of a readily volatile solvent, such as ethyl alcohol.

The presence of the glycerol on the surface of the meat is also thought to serve a useful purpose in maintaining the molecules of the fatty film in the proper orientation necessary to the continued effective existence of the film. The film formed by the fatty material on meat is believed to be monomolecular in thickness and to depend upon the presence of an intermediate layer (between the meat and fatty film) of a polar material, e.g., water for its existence. The various fatty materials suitable for use in the formation of the moisture-retarding film of the invention each possess a polar group in their configuration of atoms; for example, hexadecanol has an OH (hydroxyl) group at the end of a 16 carbon atom chain. The polar group is hydrophilic. The carbon chain being hydrophobic is repelled by water. The result is an alignment of the fatty film molecules, with the polar groups of the fatty molecules being attached to the water (of the intermediate layer) and with the long carbon chains standing on end more or less perpendicular to the water surface and closely packed. The closely packed, erect fatty molecules retard the escape of water vapor from the water surface (and hence from the meat) so long as the molecules are aligned and compressed together.

The following is offered as a possible explanation of the improved process of this invention. Glycerol is suitable for use as the material of the intermediate layer (disposed between the meat and fatty film) because of its three hydroxyl groups and low vapor pressure. Glycerol has solubility characteristics similar to water and may be substituted in whole or in part for the water in the intermediate layer. The presence of the several hydroxyl groups in glycerol attract the polar groups of the various film forming fatty materials and repel the long carbon chains of those compounds. In short, the film forming materials act toward glycerol as they do towards water, forming a moisture retarding film. The low vapor pressure of glycerol assures the continued existence of the intermediate layer to support the fatty film and the fatty film in turn is thought to reduce still further glycerol's low vapor pressure. The glycerol or glycerol-water oriented fatty film will suppress moisture evaporation from a meat carcass as does the water oriented film.

Glycerol has been commonly employed in a great variety of uses in connection with food. In fact, physiologically, it is a food, non-toxic and easily digested. It has a sweet taste and possesses little or no odor. It is used in both animal and artificial casings and various coatings developed for the meat industry.

In one embodiment of the process of the invention the meat is first coated with glycerol or preferably a glycerol water solution. An aqueous dispersion of the hexadecanol or other suitable fatty material is then applied to the glycerol coated meat to form the thin moisture retarding film.

The moisture retarding film is formed of a saturated aliphatic compound having the formula R—OH,

R—COOH where R is an aliphatic radical having at least 11 carbon atoms. Ethyl stearate may also be used. The fatty compound may be applied in the from of a glycerol dispersion, for example, an emulsion of the fatty material in glycerol or glycerol and water. The glycerol dispersion may be prepared by dissolving the fatty material in the glycerol (or glycerol and water) with the aid of a readily volatile solvent, such as ethyl alcohol. The suitable materials are, for the most part, waxy, crystalline flakes or needles which cannot be satisfactorily applied to the meat, except through a dispersion, to form the necessary thin film.

The fatty alcohols and fatty acids of the foregoing formulae vary considerably in their effectiveness in the process of the invention. Among the preferred materials are the fatty acids and alcohols having from 16 to 20 carbon atoms inclusive or mixtures of those materials. The $C_{16}$–$C_{20}$ materials will generally be found to provide the greatest resistance to water evaporation. Particularly suitable compounds include octadecanol, hexadecanol (commonly known as cetyl alcohol), stearic acid (octadecanoic acid) and arachidic acid (eicosanoic acid).

Other fatty acids that may be employed include lauric, tridecoic, myristic, palmitic, margaric acids and the higher fatty acids, such as carnaubic acid and carboceric acid. The corresponding alcohols, for example, dodecanol, tridecanol, carnaubyl alcohol and ceryl alcohol may be used, but generally, the fatty acids and alcohols, below the $C_{16}$–$C_{20}$ carbon range are less effective than those of that preferred range.

The emulsion may be prepared in the following manner. Equal weights of hexadecanol (or other suitable fatty material) and any of certain edible emulsifying agents are mixed together, after first heating both the emulsifying agent and the hexadecanol to a temperature in excess of 49° C. The warm mixture is then agitated with glycerol and water in a mechanical shaker or a blender until the hexadecanol is placed in emulsion. In an alternative, the emulsifier may be added to the warm glycerol and water and then heated fatty material introduced and the mixture shaken to form the emulsion. The suitable emulsifiers include monoglycerides, diglycerides and mixtures thereof. A preferred emulsifier contains approximately 40% monoglyceride, 40% diglyceride and 20% triglyceride and may be prepared by reacting glycerol with various animal and vegetable fats, such as lard and cottonseed oil. An esterified mixture of lactic acid and glycerol may also be employed.

The fatty acid, alcohol or ethyl stearate may be applied in dispersion of remarkably low concentrations. Concentrations of 30–1000 parts of the fatty material per million (p.p.m.) of water and glycerol (or glycerol alone) may be profitably used. However, dispersions of greater and less concentrations may be employed, depending on the particular material used. The glycerol because of its high viscosity is preferably used in water solution. Water-glycerol solutions of varying concentrations may be employed.

*Example*

Small chunks of stew beef were used in this experiment. The several chunks after treatment were refrigerated at 36° F. Sample No. 1 had no treatment at all. Sample No. 2 was dipped in water and Sample No. 3 was immersed in a 50–50% glycerol-water solution and drained. Sample No. 4 was treated with an aqueous dispersion of cetyl alcohol (50 p.p.m.). Sample No. 5 was dipped in a cetyl alcohol (50 p.p.m.) dispersion of water and glycerol (50–50% solution).

| | Initial Weight in Grams | 25 Hours | | 48 Hours | |
|---|---|---|---|---|---|
| | | Weight, Grams | Percent Shrink | Weight, Grams | Percent Shrink |
| Sample No. 1 | 44.180 | 42.980 | 2.72 | 41.700 | 5.6 |
| Sample No. 2 | 43.270 | 42.550 | 1.66 | 41.600 | 3.86 |
| Sample No. 3 | 45.600 | 44.620 | 2.14 | 43.750 | 4.05 |
| Sample No. 4 | 67.550 | 66.980 | 0.84 | 65.620 | 2.86 |
| Sample No. 5 | 42.250 | 42.280 | 0.07 (Gain) | 41.250 | 2.37 |

It will be seen from the table that the glycerol and water treatment (no cetyl alcohol) of Sample No. 3 was ineffective in reducing shrinkage, providing no more protection than the water dip of Sample No. 2. However, when used with a small amount of cetyl alcohol (Sample No. 5) the treatment reduced shrinkage significantly.

I claim as my invention:

1. An improved process for reducing moisture loss from meat comprising maintaining a moisture-retarding film of a film forming fatty material on an underlying glycerol-containing layer spread over the surface of the meat, said fatty material being selected from the group consisting of ethyl stearate and the fatty compounds having the formulae of R—OH and R—COOH, where R is an aliphatic radical having at least 11 carbon atoms and being present in an amount adequate to form said moisture-retarding film.

2. An improved process for reducing moisture loss from meat comprising applying to the surface of the meat a glycerol containing dispersion of a fatty material selected from the group consisting of ethyl stearate and the fatty compounds having the formulae of R—OH and R—COOH, where R is an aliphatic radical having at least 11 carbon atoms, said material being present in an amount sufficient to form a moisture retarding film, and holding the treated meat to obtain a beneficial reduction in moisture loss over that experienced in the absence of the treatment.

3. An improved process for reducing moisture loss from meat comprising forming a glycerol containing coating over the surface of the meat, applying to the glycerol coated meat an aqueous dispersion of a fatty material selected from the group consisting of ethyl stearate and the fatty compounds having the formulae of R—OH and R—COOH where R is an aliphatic radical having at least 11 carbon atoms, said material being present in an amount sufficient to form a thin film overlying the glycerol coating, and maintaining the film on the glycerol coated meat to obtain a beneficial reduction in moisture loss.

References Cited in the file of this patent

UNITED STATES PATENTS

| | | |
|---|---|---|
| 1,996,392 | Torrence et al. | Apr. 2, 1935 |
| 2,337,645 | Cadwell | Dec. 28, 1943 |
| 2,793,123 | Haas | May 21, 1957 |

UNITED STATES PATENT OFFICE
CERTIFICATE OF CORRECTION

Patent No. 2,989,402                                       June 20, 1961

Thomas Reid Anderson

It is hereby certified that error appears in the above numbered patent requiring correction and that the said Letters Patent should read as corrected below.

Column 1, line 46, for "attached" read -- attracted --.

Signed and sealed this 14th day of November 1961.

(SEAL)
Attest:

ERNEST W. SWIDER
Attesting Officer

DAVID L. LADD
Commissioner of Patents

USCOMM-DC